United States Patent [19]
Blair et al.

[11] Patent Number: 5,809,265
[45] Date of Patent: Sep. 15, 1998

[54] SYSTEM AND METHOD FOR MANAGING VIRTUAL CONNECTIONS BETWEEN DEVICES ON A NETWORK

[75] Inventors: Peter M. Blair, San Francisco; Phillip M. Hoare, Saratoga, both of Calif.

[73] Assignee: Wilson Sonsini Goodrich & Rosati, Palo Alto, Calif.

[21] Appl. No.: 589,158

[22] Filed: Jan. 19, 1996

[51] Int. Cl.⁶ .................................................. G06F 3/00
[52] U.S. Cl. ........................ 395/339; 395/969; 395/356
[58] Field of Search .................... 395/326–358, 395/356, 335, 339, 969, 200.02; 434/153

[56] References Cited

U.S. PATENT DOCUMENTS

| | | | |
|---|---|---|---|
| 4,939,507 | 7/1990 | Beard et al. | 345/156 |
| 5,032,989 | 7/1991 | Tornetta | 364/401 |
| 5,117,372 | 5/1992 | Petty | 395/335 |
| 5,261,044 | 11/1993 | Dev et al. | 395/159 |
| 5,287,194 | 2/1994 | Lobiondo | 358/296 |
| 5,317,680 | 5/1994 | Ditter, Jr. | 395/135 |
| 5,353,399 | 10/1994 | Kuwamoto et al. | 395/159 |
| 5,450,571 | 9/1995 | Rosekrama et al. | 395/155 X |
| 5,651,005 | 7/1997 | Kwok et al. | 370/339 |

*Primary Examiner*—Raymond J. Bayerl
*Assistant Examiner*—A. Katbab
*Attorney, Agent, or Firm*—Wilson Sonsini Goodrich & Rosati

[57] ABSTRACT

A system and method for managing virtual connections between devices on a network system such as a LAN, or a WAN, with or without connection to the public network, including in some cases connection through the Internet. Specifically, the invention involves a computer program that includes a graphical map of a geographical site such as an office building that allows each user using the network to select an output device such as a particular printer and establish a virtual connection between the user's workstation environment and the output device. This invention may also include means to enable the users to easily manage their own printer connections on a complex network system, giving the user more control and reducing the workload on the Information Services staff.

13 Claims, 7 Drawing Sheets

SYSTEM AND METHOD FOR MANAGING VIRTUAL CONNECTIONS BETWEEN DEVICES ON A NETWORK

BACKGROUND OF THE INVENTION

The present invention relates in general to network management, and in particular to the end user management of virtual connections of one or more devices on one or more networks.

COPYRIGHT AUTHORIZATION

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

In a network system, sometimes also referred to as a data transport network system, software systems do exist for managing output devices, such as printers, and for establishing virtual connections between output devices on the network and workstations. A network can be defined as a group of interconnected communicating devices. Some examples of networks are local area networks (LAN), wide area networks (WAN), with or without connections to the public network, i.e., the telephone network, and devices communicating with each other through the Internet. See generally *Data Communications: From Basics to Broadband* (2d Ed. 1996), which is incorporated herein by reference. Users can log into the network and are able to send data from software applications loaded on their workstations to output devices located on the network. These virtual connections are often established by maintaining indices of the workstations paired with devices such as printers. An example of this type of software system is the TechLaw (Automation Partners) Network Administrator. One limitation is that these indices match up a printer with a hardware node, often through the use of a unique Ethernet address or Internet protocol (IP) address of the workstation, resulting in the requirement that multiple users of a workstation use the same virtual connection. Furthermore, because of the user-unfriendly nature of these indices, virtual connection defaults for every workstation are often maintained by, for example, an information systems (IS) staff. Practically, this means that the end user cannot alter the virtual connection involving the workstation they are using without involving the IS help desk. This results in delay for the user, and a greater burden for the IS Staff.

These virtual connections often involve manipulating several levels of hardware and/or software. For example, in one instance establishing these virtual connections would involve setting Microsoft Corporation's DOS communications port (e.g., LPT1, COM1), setting the DOS port up with a printer queue on the network, selecting a Windows printer driver that matches the type of printer being selected (e.g., a Hewlett Packard LaserJet 4si software driver for the corresponding printer), setting the default printer in Windows so that the applications know which printer to use, and finally, some way of maintaining all of the settings so that the end user can continue to print at the same printer after leaving the network and then re-entering for the next use of the workstation, for example, on the next day.

Prior attempts to solve the problems have had a number of unsatisfactory features. U.S. Pat. No. 5,287,194 to Lobiondo shows a method for automatically scheduling print jobs over a network to printer devices when they are available. Lobiondo does not incorporate any sort of graphical map interface to allow the user to select printers based upon the physical layout of the building, but instead is concerned with detecting when print queues are busy and diverting print jobs (or portions of print jobs) to other printers on the network. U.S. Pat. No. 5,115,326 to Burgess et al. shows a method of routing an electronic message over a network to a location based upon information located in the header or address of the message. Burgess et al. do not use a graphical map to allow the user to select locations on the network. Instead, they detect existing address information already within the message and route the electronic message to that address. U.S. Pat. No. 4,982,346 to Girouard et al. shows a mall promotion apparatus that automates advertising in shopping malls. In addition to running sweepstakes promotions, Girouard et al. display store locator maps in a graphical user interface to assist shoppers in finding their way around the shopping mall. However, this does not describe along with locator maps the management of virtual connections between devices on a network. U.S. Pat. No. 5,032,989 to Tornetta shows a real estate location system that allows a user on a computer to graphically zero-in on a real estate property from a regional map of a given area. While Tornetta is concerned with showing the geographical context for a particular real estate property to the user, it also does not reference any way for managing virtual connections to devices on a computer network. Lastly, U.S. Pat. No. 5,393,964 to Hamilton et al. shows a machine that allows a person to select the name of a city from a list and automatically determine the area code for subsequent faxes and telephone calls. Among the contexts discussed by the Hamilton et al. device are: flight information, airline reservations, car rentals, area code information, and hotel reservations. Hamilton et al. does not use a graphical map of a collection of network devices, nor does it use such a map to maintain virtual connections between devices on a network.

SUMMARY OF THE INVENTION

One feature of the invention provides a system and method for allowing the users of a network to graphically select devices such as printers from a map of the building(s) that house the network. In another feature, an application is written that uses a graphical user interface (GUI) environment to present the end-user with a map of one or more buildings. The user is able to use a pointing device such as a mouse to click on a section of the building and another map appears that is a close-up section or localized portion of the building. In the illustrated embodiment, the user can use the GUI to quickly view a map of any portion or wing of the building(s). In the illustrated embodiment, the close-ups have enough detail to show the offices and rooms of the wing. Further, the user can click on a button that represents a printer or other output device, such as a facsimile machine, modem, storage device, workstation, or other output device. The button has a title indicating the type of printer (e.g., high speed, color, etc.) and the button is located at the approximate corresponding position in the wing as the real printer. In one embodiment, absent from the map are any overly technical descriptions of printer queues or subnets; instead, the map displays only a simple user-friendly description of the printer. This is to enhance the useability of the system for the end users by "hiding" information that is necessary for functioning of the software, but unnecessary for the typical end user. Upon clicking on a button, a virtual connection is created between the end user's workstation and the one or more devices represented by the button(s). This connection is made on multiple levels of software, i.e., on the network printer queue system, on the workstation operating system, and on the application systems. Further, the method enables the layers of this virtual connection to remain in place until the user decides to select a different output device.

DETAILED DESCRIPTION OF THE PREFERRED EMBODIMENTS

Figure 1:
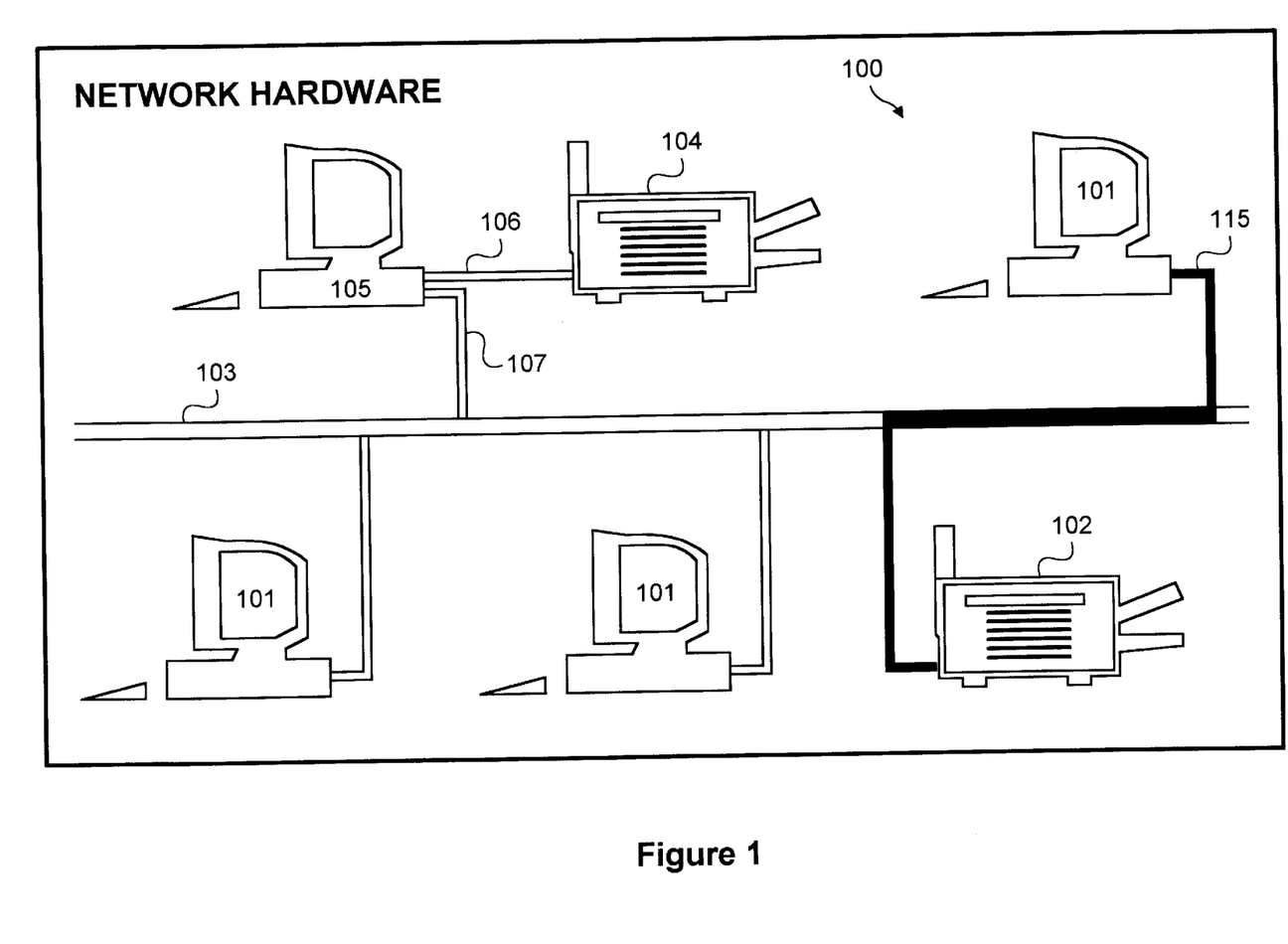
FIG. 1 is a diagram of an example of the hardware components of a computer network system.

The present invention may be applied to a computer network system 100 as shown in FIG. 1. This network system includes workstations 101 and output devices 102, 104, and 105 which are connected to the network 103 separately. FIG. 1 illustrates using printers 102 and 104 as output devices, but the present invention can be also applied to other output devices such as plotters, faxes, modems, storage devices such as a tape backup or a hard disk drive, workstations, the memory system of a workstation, and any software applications running on the workstation. For example, the output device might be used to display an E-mail message sent from an end user. For simplicity, however, the following description of the preferred embodiment will be limited to the case where the output device is a printer. Additionally, this preferred embodiment can include that an output device 104 is linked to the network through a workstation 105 through a secondary network connection 106. Such a linked connection 106 results in similar functionality as for printer 102 and virtual connection 115, except that devices 104 and 105 share a single hardware connection 107.

The present invention can provide an application with a user-friendly map-based GUI which allows end users to easily and quickly manage their own printer connections in a complex network environment. Apple Macintosh System 7, IBM's OS/2, Unix X Windows, Microsoft Corporation (MS) Windows NT, MS Windows 95, and MS Windows 3.x are all examples of workstations' operating systems that will support such a map-based GUI. Novell Netware, Banyan Vines, and MS Network are examples of network operating systems that will support such an application for managing network output devices graphically. Novell Directory Services (NDS) and Saber LAN Workstation are examples of tools that can be incorporated into such a map-based virtual connection manager. MS Visual Basic, Borland C++, and MS C are examples of application authoring tools that can be used to create the GUI, and to manipulate the other parts of the invention. Netscape Navigator and Sun Microsystem Java are examples of Internet-based software systems that can be incorporated into such a map-based virtual connection manager.

Figure 2:
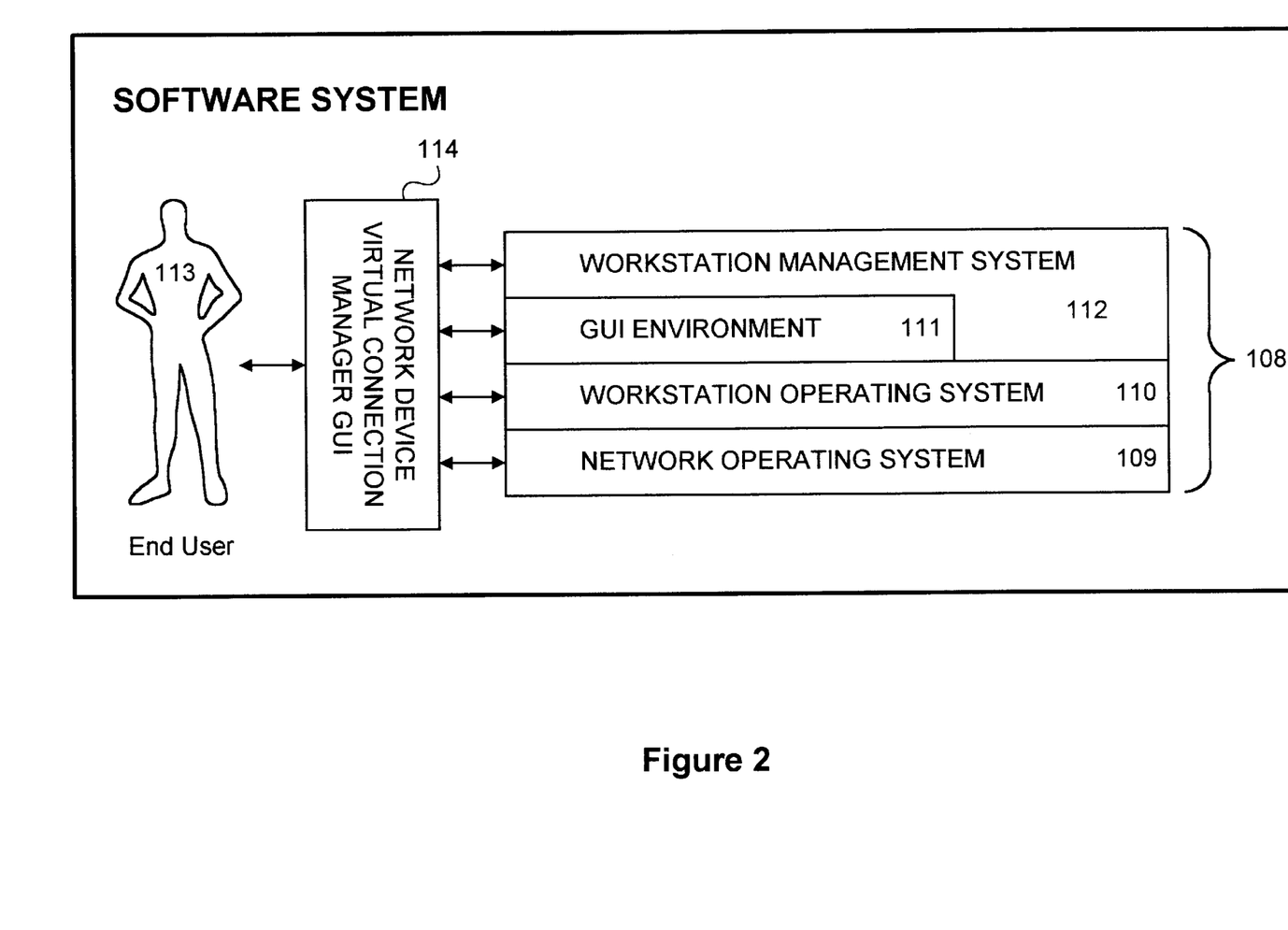
FIG. 2 is a diagram of an example of the software components of a computer network system, including one application of the present invention.

FIG. 2 illustrates the software environment 108 of the preferred embodiment. Although the present invention can be applied in other network systems such as discussed earlier, the preferred embodiment is illustrated as software environment 108, including network operating system 109 (e.g., Novell Netware version 3.12), workstation operating system 110 (e.g., MS-DOS version 5.0 or 6.22), GUI environment 111 (e.g., MS Windows version 3.x), and workstation management system 112 (e.g., Saber LAN Workstation version 5.0). When these network environments are configured with an Internet-based protocol such as the TCP/IP protocol, and are connected to the Internet, the present invention can be applied to virtual connections between communicating devices on the Internet. The software program 114 manifests the present invention by coordinating the separate layers of the software environment 108 for easy management by the end user 113. The end user 113 can manage virtual connections 115 between the workstation 101 and any output devices 102 on the network 103 for all the layers of the software environment 108.

The detailed description of the preferred embodiment of the invention can be considered from two perspectives: (1) as a set of functions performed by the preferred embodiment as perceived by the end user; and (2) as a detailed method of operation and configuration for the systems analyst.

1) Functionality for the End User

Figure 3:
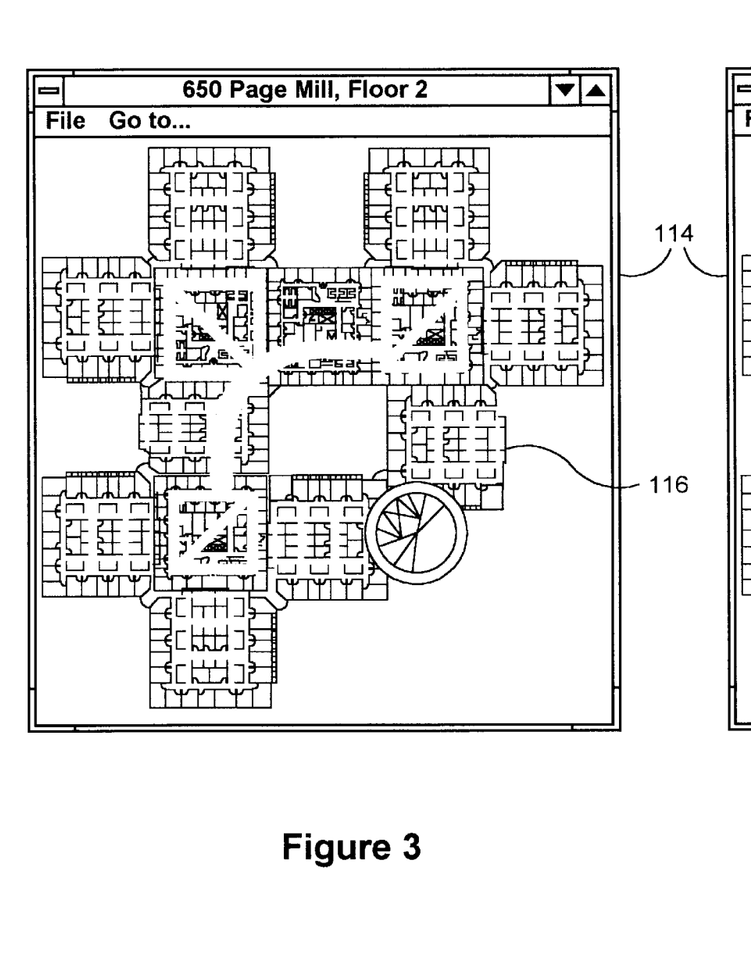
FIG. 3 is a building layout view in a GUI virtual connection manager.
Figure 4:
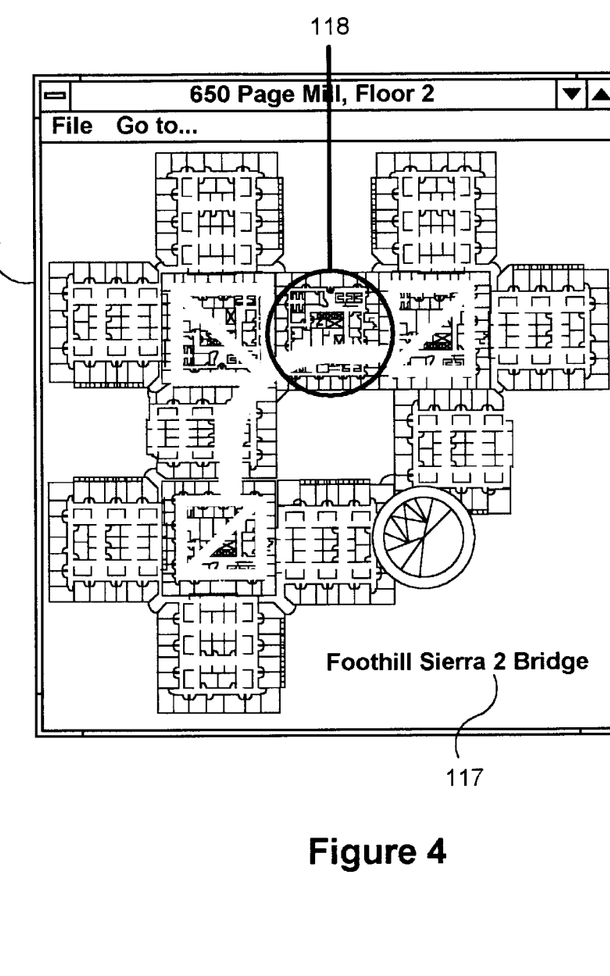
FIG. 4 is a building layout view in a GUI virtual connection manager with one portion of the building's layout visible due to mouse movement over the portion.

FIGS. 3–10 are screen shots from an example of a network device virtual connection manager graphical user interface (Printer Select) 114. Referring to FIG. 2, the end user 113 activates the printer select 114 software program when he or she wants to set up a virtual connection 115 to an output device on a network. As shown in FIGS. 3–4, a map 116 of an office building is displayed and the end user 113 can move a pointing device such as a mouse (not shown) around the map to display the names 117 (e.g. Foothill Sierra 2 Bridge) of wings 118 of the map 116. In this example, the mouse movement over a specific portion of the map 116 is sufficient to trigger the display of the name 117 of the portion 118 under the mouse. For example, FIG. 4 shows the effect of the end user positioning the mouse over the "Foothill Sierra 2 Bridge" portion of the building.

Figure 5:
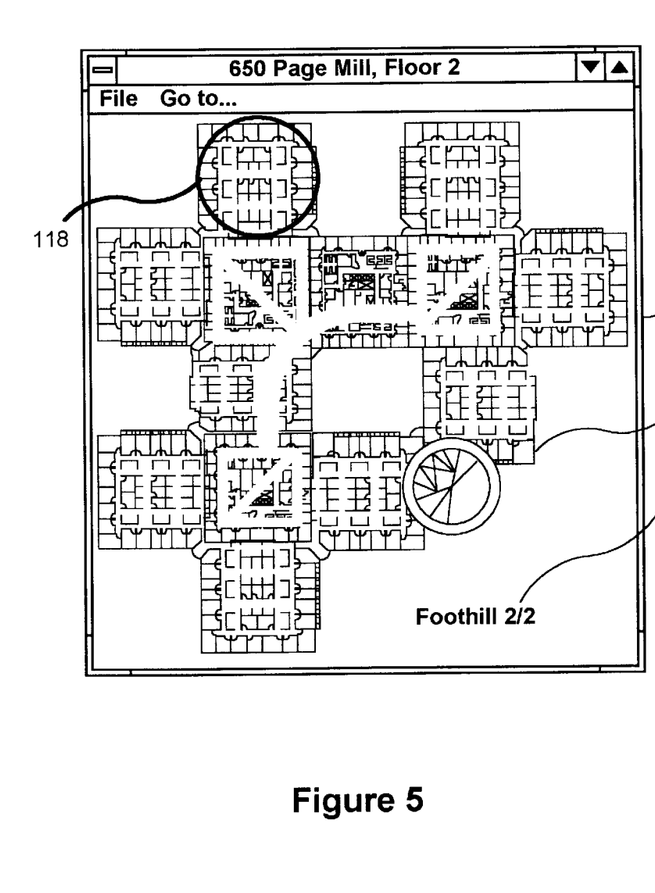
FIG. 5 is a building layout view in a GUI virtual connection manager with another portion of the view active due to mouse movement over the portion.
Figure 6:
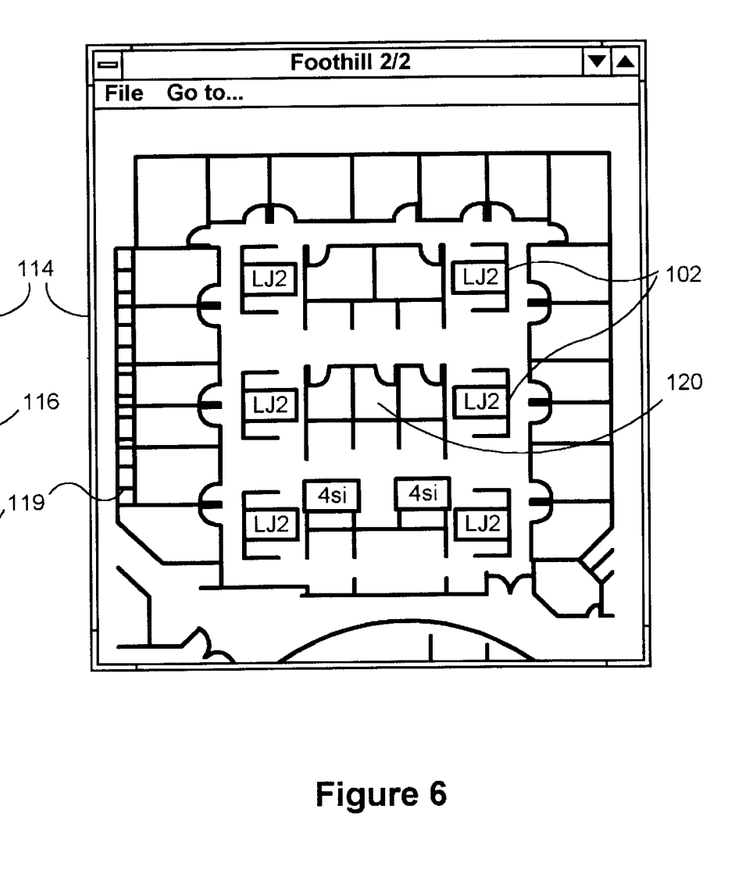
FIG. 6 is a wing layout view in a GUI virtual connection manager resulting from selecting the wing portion of the building layout view of FIG. 5.
Figure 7:
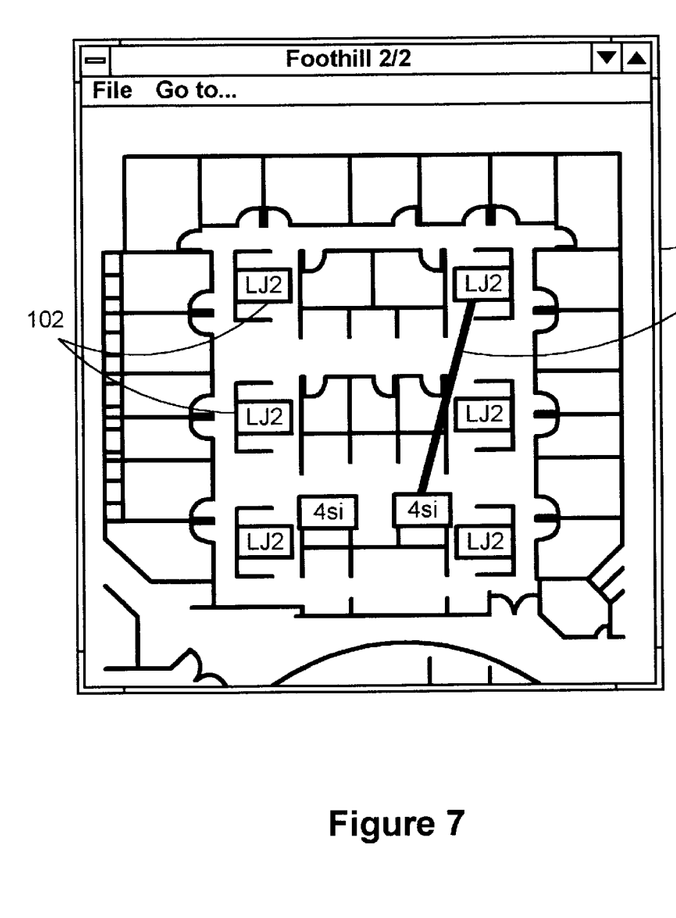
FIG. 7 is a wing layout view with a interconnect line between a regular speed printer ("LJ2") and a high speed printer ("4si").

In another example, FIG. 5 shows the end user selecting the "Foothill 2/2" section 118 of the building floor plan. Clicking on the mouse to effectuate this selection results in the display of a wing level map 119 of the selected section 118, in this case "Foothill 2/2," as shown in FIG. 6. At this level the user can see the floor plan of the wing, including individual offices, such as office 120. The user also can see all the printer output devices 102 that are available on the network 103 for that wing. The user can click the mouse when it is over the output device to activate the virtual connection 115 between the workstation and the output device on several different levels of software environment 108. The workstation that the user is on will be then connected to the selected output device. Even if the user exits the network environment, and re-enters from another workstation, the virtual connection last selected will be saved and thereafter automatically reinitialized. For all practical purposes, the printer selection will remain in place until the next time the user selects an output device.

The preferred embodiment includes the ability to select a set of output devices with a single click of the mouse. For example, when the user has the Printer Select application running with a wing level map activated such as in FIG. 7 he or she can move the mouse over the icons 102 representing the output devices before activating a virtual connection with one of the devices by clicking on an icon. When the user moves the mouse pointer over a device that is part of a set of devices, a line 121 appears. An example of a device that may be part of a set of devices is a regular speed laser printer such as a Hewlett Packard LaserJet series II (LJ2). The user may prefer to use a LJ2 for normal printing jobs, because of its location and workload, but the user in this case may also want to have the option to easily send a particularly long print job to a higher speed printer, such as a Hewlett Packard LaserJet 4si (4si). Rather than running the Printer Select program every time to change from a LJ2 to a 4si, and back, the user can select a LJ2 with a line connecting it to a 4si. This will result in the activation of two virtual connections, the default being the LJ2 for typical use, and the secondary being the 4si available to be used at any time from any application. With the use of a Workstation Management application such as Saber LAN Workstation, the user can take a print job from the default printer and put it in the queue for the secondary device if the default device is in use. Also, these secondary or additional active connections are not limited to a second printer; fax machines and color output devices are also useful network devices that the end user may want to access sufficiently to merit a secondary connection.

Another aspect of the preferred embodiment is the ability to easily manage connections with devices all around a given business enterprise, including going to other floors and buildings. The menu system allows the user to select floor plans from each physical part of a given network, allowing the user to establish virtual connections with devices located throughout the enterprise. This is useful, among other things, because it enables the user to output data and product directly to a remote location within a business enterprise, eliminating the time, cost, and error of relying on a human interdepartmental delivery system. It lightens the load on the interoffice mail system, and can speed the work flow of an organization considerably.

Figure 8:
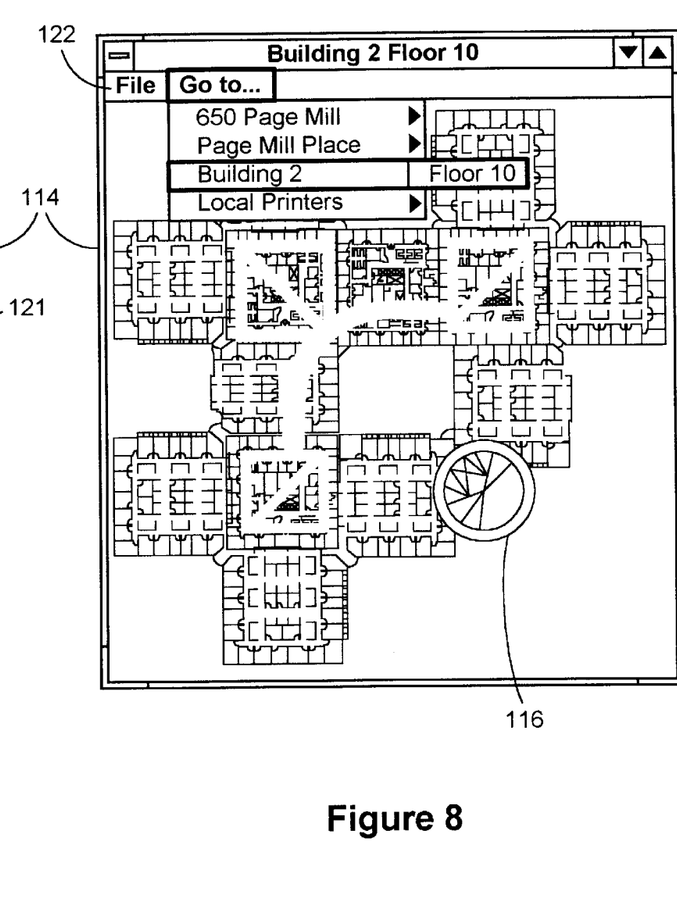
FIG. 8 is a building layout view in a GUI virtual connection manager with the menu option selected for moving to another building layout view.
Figure 9:
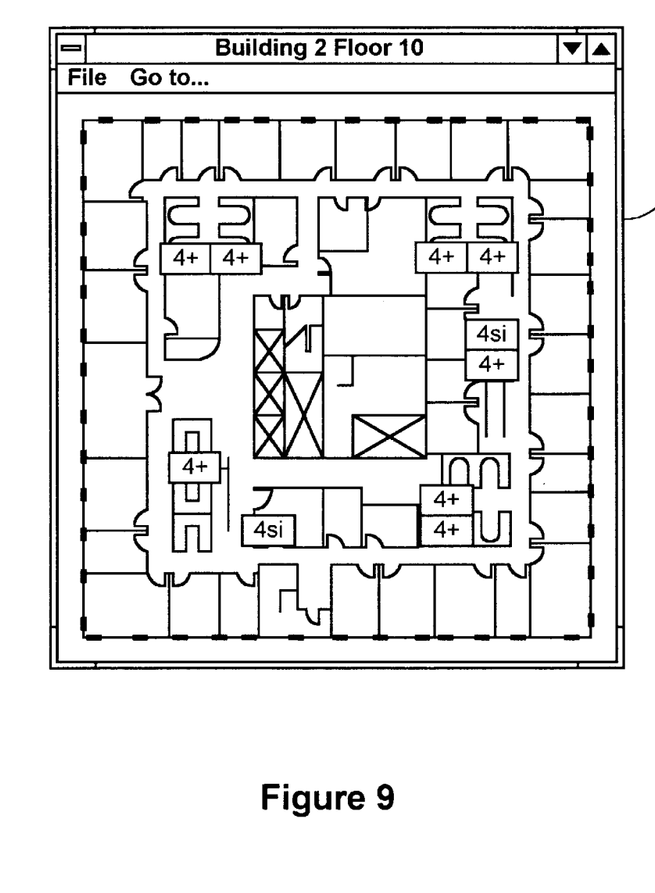
FIG. 9 is the wing layout view resulting from selecting a menu option from the building layout view of FIG. 8.

Thus, the Printer Select application enables the user to make connections in other locations by selecting other locations in a menu system 122 as shown in FIG. 8. By selecting the "Floor 10" option under the "Building 2" option on the file menu 122 as shown in FIG. 8, the user can load a localized map of another building, in this case: "Building 2, Floor 10" as shown in FIG. 9. From this localized map, the user can click on any output device on that map and establish a virtual connection to the output device.

Figure 10:
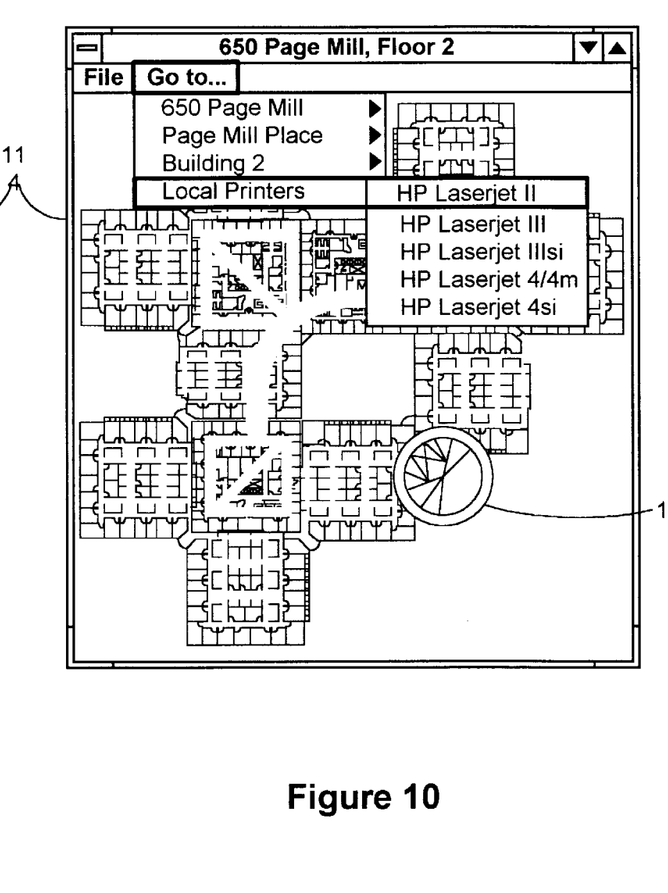
FIG. 10 is a building layout view in a GUI virtual connection manager with the menu option selected for creating a virtual connection with a local printer such as the Hewlett Packard LaserJet series II.

Additionally, the preferred embodiment also may include a method for selecting output devices that are locally connected to the workstation that the user is using. FIG. 10 depicts the "Local Printers" submenu that displays many different types of local printers. The user has the option of selecting the menu item corresponding to a local output device. The output device may not necessarily be available to any other workstations on the network.

2) Method of Operation for the Systems Analyst

One embodiment of the invention uses Microsoft Visual Basic (version 3.0) as the developing tool to create a graphical use interface that manages the virtual connections on the network. Maps of the floor plan of the buildings are scanned into a Windows-based graphics application such as Corel Photopaint version 5.0 and converted to grey scale bit maps of, for example, approximately 500×400 pixels so as to easily fit on a 640×480Windows VGA resolution. These maps are each then pasted into a Visual Basic Form as a background graphic. The result is a Visual Basic Project that contains a form for each wing (e.g., FIG. 6) of a collection of buildings, as well as a form for each macro view of a large floor plan (e.g., FIG. 3).

a) Overview of the Form Code

For larger-size floor plans, a macro-view form can be created that allows the user to zero-in on the wing-level views contained in that floor plan. The macro-view forms have source code (i.e., code lines: 1–130 set forth below) that causes portions of the map to be highlighted when the mouse pointer is moved over the corresponding area of the floor plan (See FIGS. 4 & 5, and lines 121–130). It should be noted that each of the following code lines pairs: 84–85, 87–88, 112–113, 121–122, 194–195, 197–198, 224–225, and 243–244 constitute a single line of Visual Basic source code. This displays a circle around a portion of a macro-view map, as well as the title of that section when the mouse pointer is moved over that portion of the map. This feature enables the user to move the mouse around the floor plan and decide on a section of the building to click on for a wing-level map. Upon clicking on the section (lines: 112–119), in this example, section Foothill 2/2 (FH22), the form loads a second form (lines: 133–260) that contains the selected wing-level view, and unloads itself (line: 117) to free up memory.

This example of code contains means for a menu system at the top of the GUI window for this map that allows the user to switch to other buildings or floors (lines: 57–74), in addition to a means for setting up a connection with a local device attached to the workstation as a stand alone output device (lines: 75–82). Although this example only includes a small selection of output devices, it is apparent that it would be useful to add network faxes and modems to this menu system, enabling the user to select a network fax driver or a modem port on a communications server. Other ways one could easily incorporate fax and modem features would be to set up a FAX: port in the system so that a fax driver and port connection is always in place, no matter what printer is selected. This enables the user to send faxes from within any application, from any workstation without any changes or additional setup, as decided and managed by the end user, not the IS staff.

b) Wing Level Form Code

Figure 11:
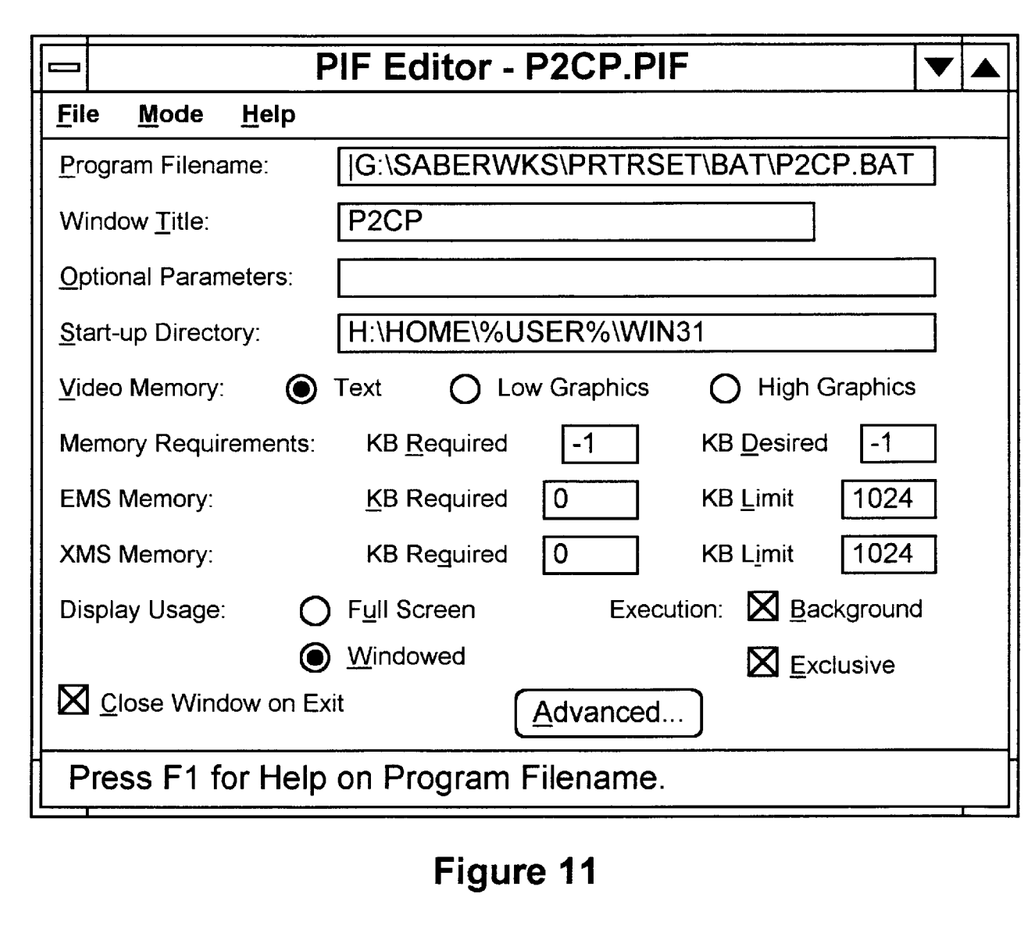
FIG. 11 is an example of a page-image file (PIF) file that can be used when setting up a virtual connection between devices.

For the wing-level forms, buttons are created on top of the graphics in each form that depict printers (FIG. 6). The title of the button is the type of printer (lines: 148–163), i.e., "4si" for a HP LaserJet 4si, "LJ2" for a HP LaserJet series II, etc. There is code that senses mouse pointer movement over a printer and will display a connecting line 121 (FIG. 7) if the mouse pointer is over a button that is part of a set (lines: 165–172, and 243–246). Additionally, each button has sets of code that activate the virtual connections to the device represented by the button when clicked (lines: 194–198, and 229–241). Once the button for a particular network device is clicked, the Visual Basic code runs a PIF file, waits for it to complete, runs the Saber Print Manager and unloads itself from memory. There is a PIF file for each output device (including the local ones activated from the menu system), and they are all functionally identical. An example of a PIF file for a device is FIG. 11. The PIF file sets the parameters for running the corresponding BATCH file in a minimized DOS session under Windows.

The corresponding BATCH file in this example uses a tool included in Saber LAN Workstation, INIMAN.EXE, to update sections of the User's Windows Initialization files. The following is an example of the batch file:

```
@echo off
set Print_Q=P2CP
set S_CONFIG=G:\saberwks\prtrset\Bat
h:
cd\home\%user%\win31
iniman WPM
```

This example updates the users' WPM.INI file to set the printer set P2CP as the active printer set in the Saber LAN Workstation. Thus, when the batch file completes the update (and the Visual Basic GUI applications senses this), the Visual Basic GUI application runs an iconized session of the Saber Printer Manager, unloading itself from memory at the same time. An example of the WPM.DEF file used in this instance is as follows:

```
;*rev=always
[Settings]
QueueRefresh=5
Notify=0
Ribbon=OFF
Status=OFF
Display=4
HSpacing=200
VSpacing=200
XMargins=25
YMargins=25
;*rev=always
[WorkSpace]
Window=281,362,358,120,3
Group1=G:\SABERWKS/PRTRSET\
%PRINT_Q%.SPS,1,0,0,496,179,0,0
Groups=1,G:\SABERWKS\PRTRSET\%PRINT_Q%.SPS
```

As the Saber Printer Manager loads, it looks at the information in the WPM.INI file to activate the set of output devices set by the information from the BATCH file. The last two lines of the WPM.DEF file incorporate the DOS variable set in the P2CP.BAT file example above. The Visual Basic application, upon activating, immediately looks for a running Saber Print Manager Session and saves it and closes it before continuing. This results in the Saber Print Manager using the settings in the WPM.INI each time it is activated.

All of this activity occurs as a result of a single click by the user. Connections between the user's workstation and selected devices on the network can be set up in Netware, DOS, Windows, and Saber Print Manager.

| SOURCE CODE |
| --- |

```
 2    Begin Form Floor2
 3      Caption = "650 Page Mill, Floor 2"
 4      ClientHeight = 5955
 5      ClientLeft = 1905
 6      ClientTop = 1050
 7      ClientWidth = 5820
 8      Height = 6645
 9      Icon = FLOOR2.FRX:0000
10      Left = 1845
11      LinkTopic = "Form1"
12      ScaleHeight = 5955
13      ScaleWidth = 5820
14      Top = 420
15      Width = 5940
16
17    Begin Label TXT
18      AutoSize = -1 'True
19      BackColor = &H00FFFFFF&
20      BackStyle = 0 'Transparent
21      Caption = "Foothill 2/2"
22      FontBold = -1 'True
23      FontItalic = 0 'False
24      FontName = "Arial"
25      FontSize = 13.5
26      FontStrikethru = 0 'False
27      FontUnderline = 0 'False
28      ForeColor = &H00800000&
29      Height = 315
30      Index = 10
31      Left = 3360
32      TabIndex = 9
33      Top = 5160
34      Width = 1425
35    End
36
37    Begin Shape CIRC
38      BorderColor = &H00800000&
```

| SOURCE CODE |
| --- |

```
39          BorderWidth = 3
40          Height = 1455
41          Index = 0
42          Left = 960
43          Shape = 3 'Circle
44          Top = 0
45          Width = 1815
46        End
47
48        Begin Image Image1
49          DataSource = "h:\home\pmb\2ndfr2.bmp"
50          Height = 5895
51          Left = 0
52          Picture = FLOOR2.FRX:0302
53          Top = 0
54          Width = 5865
55        End
56
57        Begin Menu File
58          Caption = "File"
59          Begin Menu Exit
60            Caption = "Exit"
61          End
62        End
63        Begin Menu Goto
64          Caption = "Go to..."
65          Begin Menu PM650
66            Caption = "650 Page Mill "
67            Begin Menu f1650
68              Caption = "Floor 1"
69            End
70            Begin Menu f2650
71              Caption = "Floor 2"
72            End
73          End
74        End
75        Begin Menu Local
76          Caption = "Local Printers"
77            Begin Menu HP4si
78              Caption = "HP Laserjet 4si"
79            End
80          End
81     End
82  End
83
84  Declare Function FindWindow% Lib "user" (ByVal lpClassname As Any, ByVal
85  lpCaption As Any)
86  Declare Function GetModuleUsage% Lib "Kernel" (ByVal hModule%)
87  Declare Function Sendmessage& Lib "user" (ByVal hwnd%, ByVal wMsg%,
88  ByVal wParam%, ByVal lParam As Long)
89
90  Sub Form_Load ()
91  On Error Resume Next
92  AppActivate "Saber Print Manager"
93  If((Err > 5) Or (Err < 5)) Then
94  SendKeys "%{F4}", True
95  End If
96        TXT(10).Visible = False
97        CIRC(0).Visible = False
98  End Sub
99
100 Sub HP4si_Click ()
101       Screen.MousePointer = 11      'Change pointer to hourglass.
102       Dim y, Msg                    'Declare variables.
103       A% = Shell("g:\saberwks\prtrset\bat\HPLJ4si.pif", 7)
104       While GetModuleUsage(A%) > 0
105         Z% = DoEvents()
106       Wend
107       y = Shell("WPM.EXE", 2)
108       SendKeys "%{F4}", True         'Close WPM
109       Unload Floor2
110 End Sub
111
112 Sub Image1_MouseDown(Button As Integer, Shift As Integer, x As Single, y As
113 Single)
114      'FH22
115      If((x > 1320 And x < 2415) And (y > 120 And y < 1210)) Then
116      FH22.Show
```

SOURCE CODE

```
117     Unload Floor2
118     End If
119 End Sub
120
121 Sub Image1_MouseMove (Button As Integer, Shift As Integer, x As Single, y As
122 Single)
123     TXT(10).Visible = False
124     CIRC(0).Visible = False
125 'FH22
126     If((x > 1320 And x < 2415) And (y > 120 And y < 1210)) Then
127     TXT(10).Visible = True
128     CIRC(0).Visible = True
129     End If
130 End Sub
131
132
133 Begin Form FH22
134     Caption = "Foothill 2/2"
135     ClientHeight = 5145
136     ClientLeft = 2235
137     ClientTop = 1500
138     ClientWidth = 4860
139     Height = 5835
140     Left = 2175
141     LinkTopic = "Form2"
142     Picture = FH22.FRX:0000
143     ScaleHeight = 5145
144     ScaleWidth = 4860
145     Top = 870
146     Width = 4980
147
148 Begin CommandButton P2CP
149         Caption = "4si"
150         Height = 255
151         Left = 2760
152         TabIndex = 0
153         Top = 3480
154         Width = 375
155     End
156 Begin CommandButton P2ci
157         Caption = "LJ2"
158         Height = 255
159         Left = 1320
160         TabIndex = 5
161         Top = 3720
162         Width = 375
163     End
164
165 Begin Line Line1
166         BorderColor = &H00800000&
167         BorderWidth = 10
168         X1 = 2040
169         X2 = 1440
170         Y1 = 3600
171         Y2 = 3840
172     End
173
174 Begin Menu File
175         Caption = "File"
176         Begin Menu Exit
177             Caption = "Exit"
178         End
179     End
180     Begin Menu Goto
181         Caption = "Go to..."
182         Begin Menu PM650
183             Caption = "650 Page Mill"
184             Begin Menu F1650
185                 Caption = "Floor 1"
186             End
187             Begin Menu F2650
188                 Caption = "Floor 2"
189             End
190         End
191 End
192 End
193
194 Declare Function FindWindow% Lib "user" (ByVal lpClassname As Any, ByVal
```

-continued

SOURCE CODE

```
195  lpCaption As Any)
196  Declare Function GetModuleUsage% Lib "Kernel" (ByVal hModule%)
197  Declare Function Sendmessage% Lib "user" (ByVal hwnd%, ByVal wMsg%,
198  ByVal wParam%, ByVal lParam As Long)
199
200  Sub Exit_Click ()
201  Unload FH22
202  End
203  End Sub
204
205  Sub F1650_Click ()
206  floor1.Show
207  Unload FH22
208  End Sub
209
210  Sub F2650_Click ()
211  floor2.Show
212  Unload FH22
213  End Sub
214
215  Sub F650_Click ()
216  floor2.Show
217  Hide
218  End Sub
219
220  Sub Form_Load ()
221  line1.Visible = False
222  End Sub
223
224  Sub Form_MouseMove (Button As Integer, Shift As Integer, X As Single, Y As
225  Single)
226  line1.Visible = False
227  End Sub
228
229  Sub P2ci_Click ()
230      Screen.MousePointer = 11      'Change pointer to hourglass.
231      On Error Resume Next
232      Dim Y, Msg                    'Declare variables.
233      A% = Shell("g:\saberwks\prtrset\bat\P2ci.pif", 7)
234      While GetModuleUsage(A%) > 0
235         z% = DoEvents()
236      Wend
237      Y = Shell("WPM.EXE", 2)
238      'SendKeys "%{F4}", True        'Close WPM
239      Unload FH22
240      End
241  End Sub
242
243  Sub P2ci_MouseMove (Button As Integer, Shift As Integer, X As Single, Y As
244  Single)
245  line1.Visible = True
246  End Sub
247
248  Sub P2CP_Click()
249      Screen.MousePointer = 11      'Change pointer to hourglass.
250      On Error Resume Next
251      Dim Y, Msg                    'Declare variables.
252      A% = Shell("g:\saberwks\prtrset\bat\P2cp.pif", 7)
253      While GetModuleUsage(A%) > 0
254         z% = DoEvents()
255      Wend
256      Y = Shell("WPM.EXE", 2)
257      'SendKeys "%{F4}", True        'Close WPM
258      Unload FH22
259      End
260  End Sub
261
```

The invention now being fully described, it will be apparent to one of ordinary skill in the art that many changes and modifications can be made thereto without departing from the spirit or scope of the appended claims.

What is claimed is:

1. A method for establishing a virtual connection between a workstation and an output device on a network, the network including a plurality of output devices distributed across a geographic location, the method comprising:

(a) displaying to an end user of the workstation a large scale map of the geographic location, with the geographic location including a plurality of localized portions, with each of the localized portions containing a plurality of the output devices;

(b) allowing the end user to select one of the localized portions;

(c) displaying to the end user a small scale map of the selected localized portion, the small scale map including a display of the output devices located in the selected localized portion;

(d) allowing the end user to select one of the output devices displayed on the small scale map; and (e) providing a virtual connection across the network between the workstation and the output device selected by the user, wherein the virtual connection effectively remains in place until the end user selects a different one of the output devices.

2. The method of claim 1, wherein at least one of the output devices comprises a printer.

3. The method of claim 1, wherein the end user selects one of the localized portions by using a pointing device.

4. The method of claim 1, wherein the end user selects one of the localized portions by clicking one or more times with a mouse.

5. The method of claim 1, further comprising using a selection device to select one of the localized portions, and displaying the name of the localized portion when the selection device is over the localized portion on the large scale map.

6. The method of claim 1, wherein in allowing the end user to select one of the localized portions, the end user selects from a menu of a plurality of different, remote localized portions.

7. A method for establishing virtual connections between a workstation and a primary output device and a secondary output device on a network, the network being distributed across a geographic location, the method comprising:

(a) displaying to an end user of the workstation a large scale map of the geographic location, wherein the geographic location includes a plurality of localized portions, and wherein at least one localized portion contains a primary output device and a secondary output device;

(b) allowing the end user to select at least one of the localized portions;

(c) displaying to the end user a small scale map of the localized portions, the small scale map including a display of the primary and secondary output devices located in the one selected localized portion;

(d) allowing the end user to select the primary and a secondary output device displayed on the small scale map; and (e) providing a virtual connection across the network between the workstation and the primary and secondary output devices selected by the user, wherein the virtual connection effectively remains in place until the end user selects a different one of the output devices.

8. The method of claim 7, wherein at least one of the primary or the secondary output devices comprises a printer.

9. The method of claim 7, wherein the end user selects one of the localized portions by using a pointing device.

10. The method of claim 7, wherein the end user selects one of the localized portions by clicking one or more times with a mouse.

11. The method of claim 7, further comprising using a selection device to select one of the localized portions, and displaying the name of the localized portion when the selection device is over the localized portion on the large scale map.

12. The method of claim 7, wherein in allowing the end user to select one of the localized portions, the end user selects from a menu of a plurality of different, remote localized portions.

13. A system for establishing a virtual connection between a workstation and an output device on a network, the network including a plurality of output devices distributed across a geographic location, comprising:

(a) means for displaying to an end user of the workstation a large scale map of the geographic location, with the geographic location including a plurality of localized portions, with each of the localized portions containing a plurality of the output devices;

(b) means for allowing the end user to select one of the localized portions;

(c) means for displaying to the end user a small scale map of the selected localized portion, the small scale map including a display of the output devices located in the selected localized portion;

(d) means for allowing the end user to select one of the output devices displayed on the small scale map; and (e) means for providing a virtual connection across the network between the workstation and the output device selected by the end user, wherein the virtual connection effectively remains in place until the end user selects a different one of the output devices.

* * * * *